United States Patent [19]
Baik

[11] Patent Number: 5,848,219
[45] Date of Patent: Dec. 8, 1998

[54] RECORDING FORMAT FOR AN AUDIO SIGNAL AND A VCR CIRCUIT AND METHOD OF OPERATION FOR PRODUCING SAME

[75] Inventor: Se-hyun Baik, Suwon, Rep. of Korea

[73] Assignee: Samsung Electronics Co., Ltd., Kyungki-do, Rep. of Korea

[21] Appl. No.: 533,605

[22] Filed: Sep. 25, 1995

Related U.S. Application Data

[63] Continuation of Ser. No. 202,891, Feb. 28, 1994, abandoned.

[30] Foreign Application Priority Data

Feb. 26, 1993 [KR] Rep. of Korea ................... 1993-2761
Oct. 6, 1993 [KR] Rep. of Korea ................. 1993-20868

[51] Int. Cl.[6] ..................................................... H04N 5/91
[52] U.S. Cl. .............................. 386/99; 386/104; 360/48; 360/22
[58] Field of Search .............................. 360/19.1, 18, 24, 360/48, 61, 64, 22; 358/343; 386/52, 54, 95, 96, 98, 99, 104, 36, 39, 4, 40

[56] References Cited

U.S. PATENT DOCUMENTS

| | | | |
|---|---|---|---|
| 4,672,467 | 6/1987 | Heitmann | 360/19.1 |
| 5,311,372 | 5/1994 | Matsumi et al. | 360/22 X |
| 5,315,445 | 5/1994 | Fukumoto et al. | 360/19.1 |
| 5,317,412 | 5/1994 | Morioka | 360/19.1 X |
| 5,386,323 | 1/1995 | Ishiwata et al. | 360/19.1 |
| 5,410,435 | 4/1995 | Sakai et al. | 360/64 X |
| 5,418,653 | 5/1995 | Togashi et al. | 360/64 X |
| 5,473,478 | 12/1995 | Nakashika | 360/64 X |
| 5,491,590 | 2/1996 | Endo et al. | 360/48 X |
| 5,499,106 | 3/1996 | Arano et al. | 360/19.1 X |

*Primary Examiner*—Andrew L. Sniezek
*Attorney, Agent, or Firm*—Sughrue, Mion, Zinn, Macpeak & Seas, PLLC

[57] ABSTRACT

A recording format for audio signal recording in a VCR, wherein an audio signal is divided into a predetermined number of sectors and recorded so that a video signal is recorded in a predetermined region on a track and an audio signal representing a predetermined number of N channels is recorded outside of the predetermined region, wherein the number of audio sectors located on one track is identical to 1/M times the number of channels in a magnetic tape, including an edit gap so as to permit an independent editing which is provided between the video region and audio region or between the audio sector, and wherein N and M are integers greater than 1. The number of audio sectors is reduced by 1/M as compared with the number of channels. Therefore, audio or video signals corresponding to the recovered edit gap region can be recorded, to thereby improve record capacity. An apparatus adapted to produce the record format and a corresponding method are also described.

15 Claims, 8 Drawing Sheets

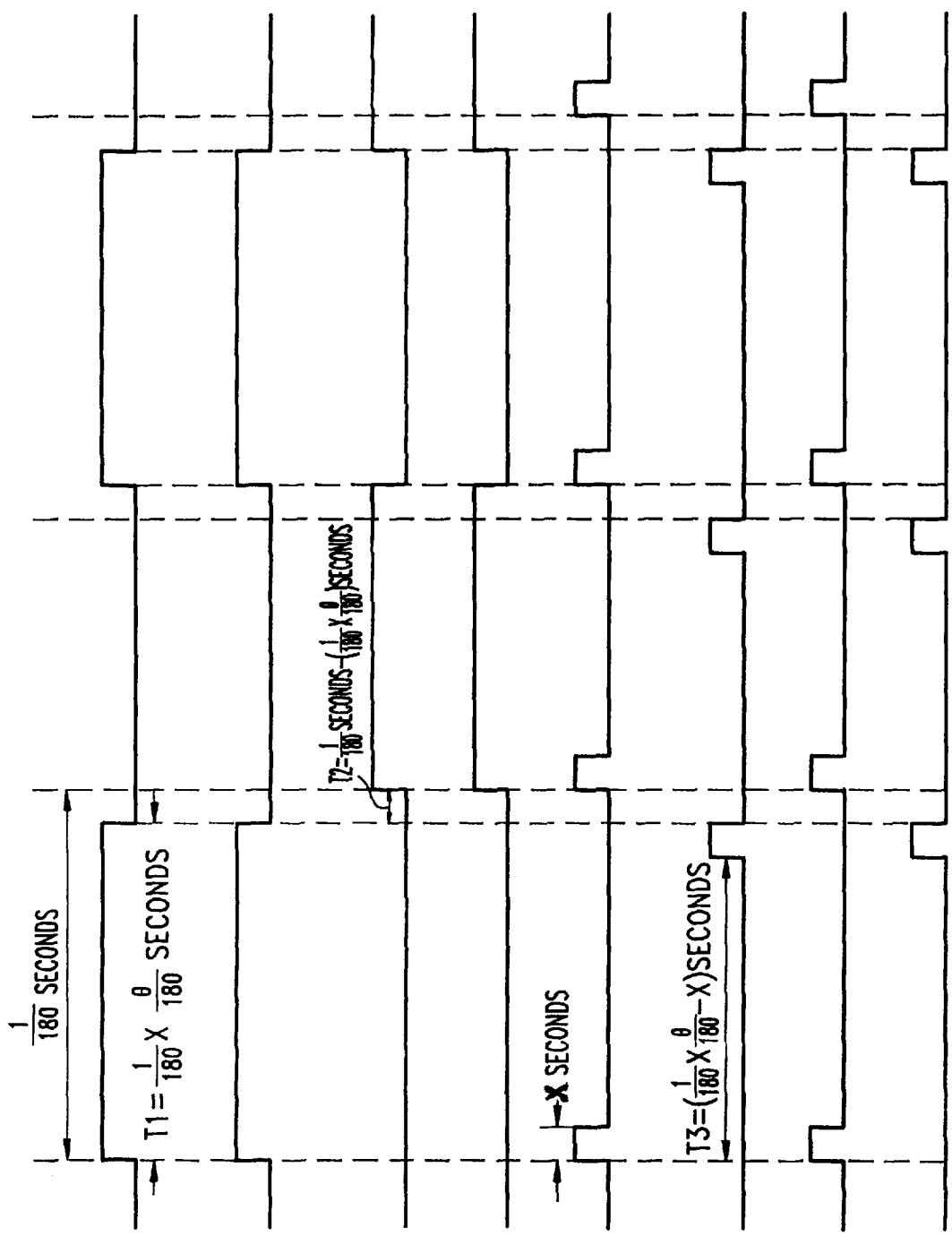

RECORDING FORMAT FOR AN AUDIO SIGNAL AND A VCR CIRCUIT AND METHOD OF OPERATION FOR PRODUCING SAME

This is a Continuation of application Ser. No. 08/202,891 filed Feb. 28, 1994 now abandoned.

BACKGROUND OF THE INVENTION

1. Field of the Invention

The present invention is related to audio signal recording format used in a video cassette recorder, and more particularly, to an audio signal recording format for reducing the number of edit gaps existing on the track by dividing an audio signal of N-channels into N-sectors on a track of magnetic tape and by dispersing the divided audio signal to a predetermined number of tracks. A recording apparatus and corresponding method therefor are also disclosed.

Korean Patent Application Nos. 93-2761 and 93-20868 are incorporated herein by reference for all purposes.

2. Discussion of Related Art

In a video cassette recorder (VCR) for a broadcasting system where the national television system committee (NTSC) signal is recorded, the recording capacity for recording video and audio signals on the track of a magnetic tape is usually in the relatively low range of 130~260 megabits per second. More specifically, the limited region of a magnetic tape must be used efficiently in order to record a signal requiring a large recording capacity, e.g., 1.2 gigabits per second, which is often found in the signal for a high definition broadcasting system, on a magnetic tape.

Two methods are possible for recording additional data on the track of a magnetic tape having a limited length. First, recording density can be increased by making the signal wavelength for recording onto a magnetic tape as short as possible. Second, the maximum effective data-recording region can be secured for each the track of a magnetic tape.

The first alternative presents considerable difficulties and limitations in view of the manufacturing process. For example, the video head gap may need to be reduced. Therefore, the second alternative, where the region occupied by an edit gap existing as an empty space between each sector on the existing track is reduced, thereby securing a larger effective data region, is more desirable.

The edit gap is a non-storing data region which exists between the sectors by a predetermined spacing whose aim is to provide an independent edit region and, thus, remove any interference between the signals being recorded in sector units. The edit gaps exist between audio sectors as well as between a video sector and an audio sector, etc.

FIG. 1A shows a tape format where video and audio signals are recorded using four channels, while FIG. 1B shows a tape format where video and audio signals are recorded using eight channels.

Here, each track consists of one video sector and four audio sectors for recording an audio signal as shown in FIG. 1A, and one video sector and eight audio sectors as shown in FIG. 1B.

As shown in FIG. 1A and FIG. 1B, four and eight edit gaps, that is a number N of edit gaps corresponding to the number of channels per track, respectively, exist on one track. Since the length of one edit gap is approximately 0.25 mm, the region used for the edit gap is approximately 1.0 mm when the number of channels on one track is four.

An audio signal of the same channel is recorded on the adjacent sector for independent editing of each channel. For example, in FIG. 1A, in the uppermost audio sector of each track, audio data A4 of the same channel is always recorded.

Thus, in the prior art, when a video signal is recorded in the center and an audio signal is recorded at both ends, as shown in FIG. 1A and FIG. 1B, the audio signal is recorded, after being divided into a plurality of sectors, on one track, where number of sectors is equal to the number of channels. Therefore, when an audio signal is recorded into N channels, N edit gaps are needed since an audio signal is divided into N audio sectors per track and recorded. Accordingly, magnetic tape cannot be effectively used due to the edit gap.

SUMMARY OF THE INVENTION

To solve the above problems, the principal object of the present invention is to provide a recording format for an audio signal of a VCR, wherein the audio signal is recorded by the number of sectors reduced by a factor of 1/M with respect to the number of channels on one track, e.g., when an N-channel audio signal is divided into N-sectors and is recorded on magnetic recording media, where N and M are both integers greater than 1.

Another object of the present invention is to provide a recording apparatus for an audio signal of the VCR, wherein the apparatus further records an audio signal or a video signal to the degree of the reduced region of an edit gap, after reducing the number of edit gaps existing on one track by 1/M ratio with respect to the number (N) of channels, by means of dividing an audio signal in N-channels into N-sectors and dispersing the divided audio signal to a predetermined number of tracks.

These and other objects, features and advantages according to the present invention are provided by a recording format for an audio signal (of a VCR) stored by magnetic recording media produced by a VCR where a video signal is recorded on a predetermined region of a track and an audio signal of a channel having a predetermined number (N) of channels is divided into a predetermined number (N) of audio sectors and recorded outside of the region, and where an edit gap for independent editing is provided one of between the audio and video regions and between the audio sectors, wherein the format reduces the edit gap by 1/M ratio by distributing an audio signal for N audio sectors to M tracks so that the number of audio sectors on one track is identical to 1/M with respect to the numbers of channels, provided that N and M are integers greater than 1.

Furthermore, these and other objects, features and advantages according to the present invention are provided by a recording method for audio signal (of a VCR), recording on a magnetic recording media using a VCR wherein a video signal is recorded on a predetermined region on a track, and dividing an audio signal representing a predetermined number (N) of channels is divided into a predetermined number (N) of audio sectors and the divided audio signal is recorded outside of the predetermined region, and an edit gap is provided, for independent editing, one of between the audio and video regions and between the audio sectors. The method includes steps for:

(a) digitizing an analog audio signal input from an audio signal source into N channels to thereby provide digital signals representing N channels;

(b) respectively storing the digital signals corresponding to N channels output during step (a);

(c) converting signals stored in the storing step (b) into signals suitable for recording onto the magnetic recording media into respective audio sectors; and (d) distributing the audio signals of N audio sectors converted in the converting step (c) onto M tracks so that the numbers of audio sectors on one track is identical to 1/M times the number of channels, whereby the edit gap is be reduced by a 1/M ratio, provided that N and M are integers greater than 1.

These and other objects, features and advantages of the present invention are provided by an audio signal recording apparatus for recording an audio signal on magnetic recording media, wherein a digital video signal is recorded into a predetermined region on a track and a digital audio signal representing a predetermined number (N) of channels is divided into audio sectors and recorded outside of the predetermined region and an edit gap is provided one of between the video region and the audio region and between the audio sectors to permit independent editing, the apparatus including:

a plurality of memories for dividing the digital audio signal into N channels and storing respective results; and a controller for dispersing audio signals of N audio sectors stored in respective memories onto M tracks so that the number of audio sectors on one track can be identical with 1/M with respect to the number of channels, whereby the edit gap is reduced by a 1/M ratio where N and M are both integers greater than 1.

BRIEF DESCRIPTION OF THE DRAWINGS

The above objects and other advantages of the present invention will become more apparent by describing in detail a preferred embodiment thereof with reference to the attached drawings in which:

FIGS. 6A through 6H collectively form is a timing diagram showing the operation of an audio signal recording apparatus shown in FIG. 5.

DETAILED DESCRIPTION OF PREFERRED EMBODIMENTS

Figure 2:
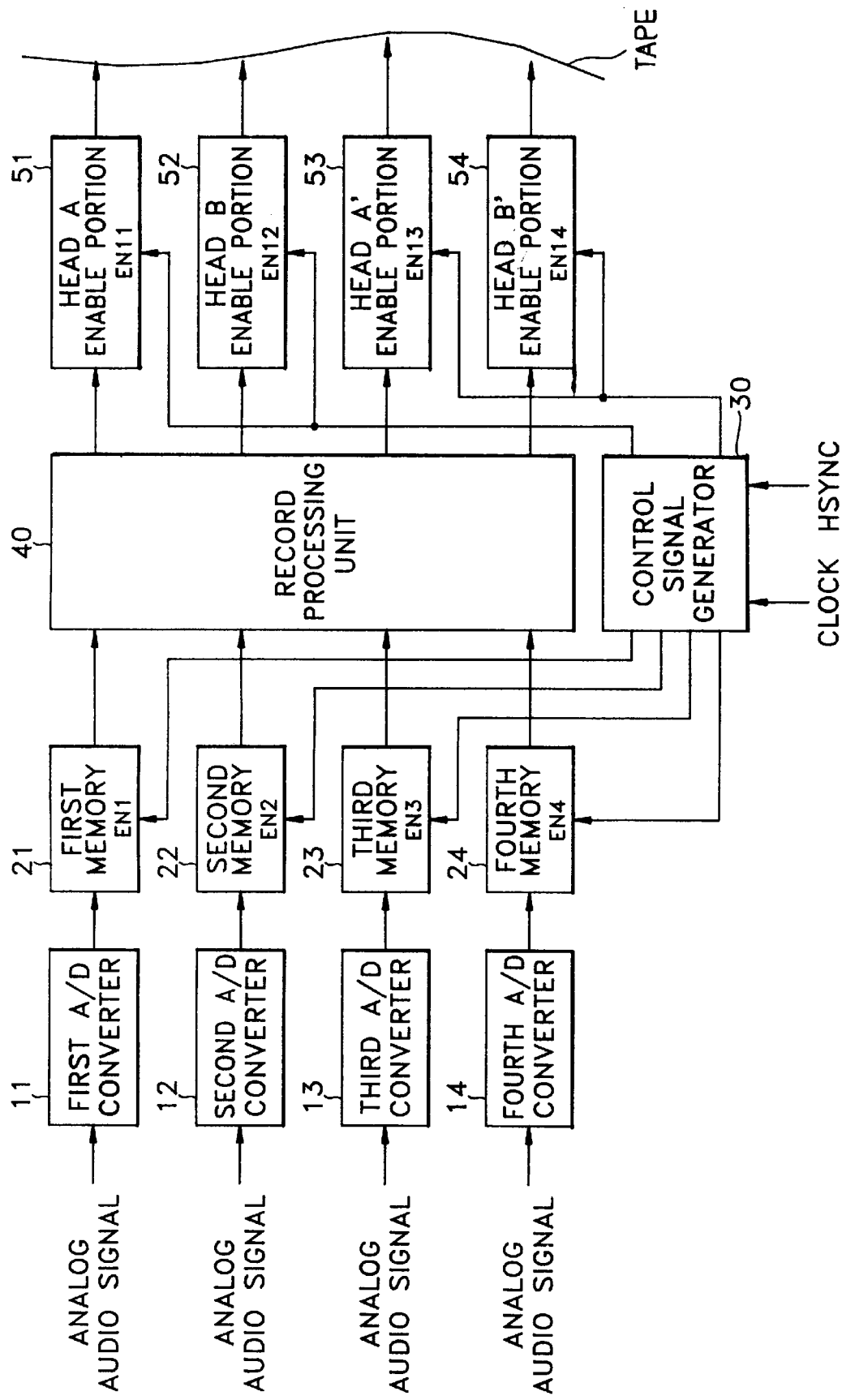
FIG. 2 is a block diagram of an embodiment of a VCR recording apparatus for an audio signal according to the present invention.

FIG. 2 is a block diagram of an embodiment of a video cassette recorder (VCR) recording apparatus for an audio signal according to the present invention. Here, the recording apparatus comprises a plurality of analog-to-digital (A/D) converters 11 to 14 for converting the introduced analog audio signal into a digital signal, a plurality of memories 21 to 24 equal in number to the number of A/D converters storing the digitized audio signal, a record processing unit 40 for modulating the audio signal stored in memories 21 to 24 into signals suitable for recording on a magnetic tape, a plurality of heads 51 to 54 for recording a plurality of channel signals output from record processing unit 40 into respective predetermined audio regions of the tape, a control signal generator 30 receiving a clock signal and a horizontal sync (Hsync) signal generating memory enable signals for enabling memories 21 to 24 as a result of, providing enable signals to enable terminals EN1 to EN4 of memories 21 to 24 and for generating head enable signals which enables a plurality of head 51 to 54 and for providing the result to enable terminals EN11 to EN14 of heads 51 to 54.

The operation of an audio signal recording apparatus shown in FIG. 2 will now be explained while referring to FIG. 2, FIG. 3 and FIGS. 4A through 4H.

Referring to FIG. 2, in first to fourth A/D converters 11 to 14 for receiving the four-channelled analog audio signal from an audio source, an analog audio signal is converted into digital data suitable for recording, which digital data is then stored in first to fourth memories 21 to 24, respectively.

It should be noted that a source coding, for example, data compression, can be performed before storing the data into first to fourth memories 21 to 24.

Among the audio data stored in memories 21 to 24, only the output of the memory enabled by respective memory enable signals is input to record processing unit 40, converted into a suitable waveforms for recording on magnetic tape, and then recorded onto the tape through four heads 51 to 54.

Preferably, a channel coding is performed in record processing unit 40 where the signal is modulated into the signal suitable for recording, e.g, eight-to-fourteen modulation (EFM) signal, as is widely known.

Figure 3:
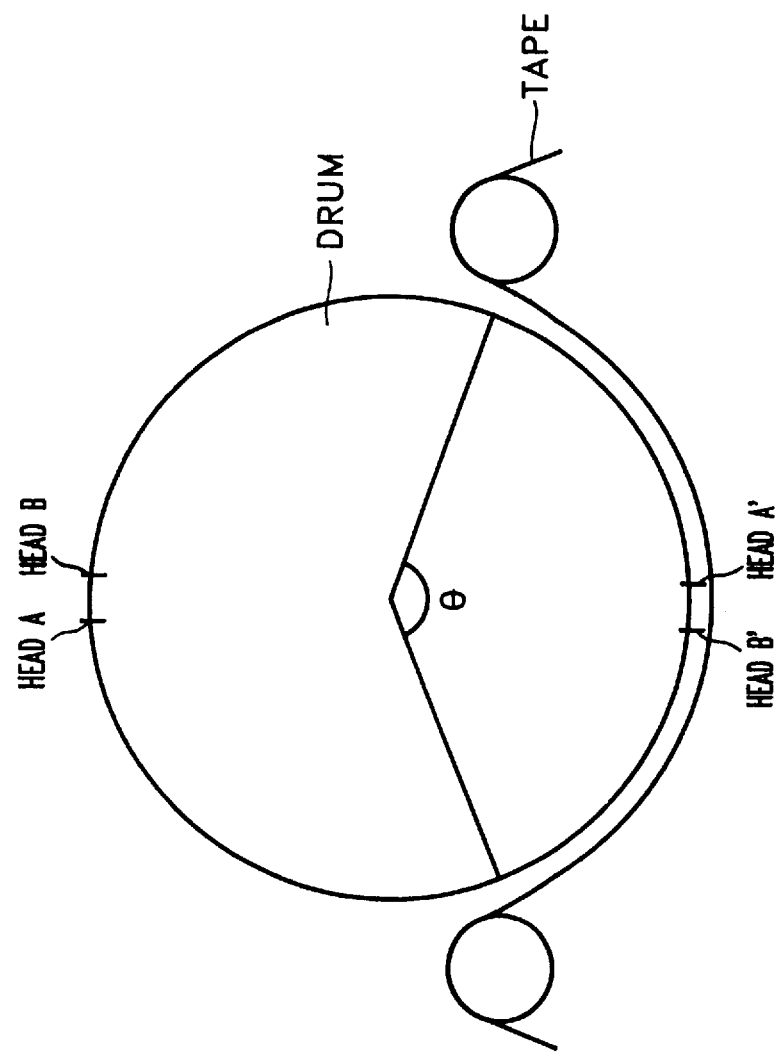
FIG. 3 is a view for illustrating a head on a drum and an angle where a magnetic tape is lapped to the drum, for a better understanding of the present invention.

The four heads 51 to 54 for recording the output of record processing unit 40 consist of four channel heads A, B, A' and B', respectively as shown in greater detail in FIG. 3. These four heads 51 to 54, enabled responsive to head enable signals generated from control signal generator 30, record the output of record processing unit 40 to predetermined audio sectors arranged along the track.

For simplicity, assume that data of first memory 21 is A1, data of second memory 22 is A2, data of third memory 23 is A3, and data of fourth memory 24 is A4. The process for recording data A1 to A4 onto a tape can be explained as follows. First, the control signals (memory enable signals and head enable signals) for controlling the input/output of data are output from control signal generator 30 as shown in FIGS. 4A to 4H.

The control signals (head enable signals and memory enable signals) generated by control signal generator 30 and input to four heads 51 to 54 and to first to fourth memories 21 to 24, can be explained as follows. It should be noted that a system controller (not shown), instead of control signal generator 30, can be used to advantageously generate the control signals.

A rotation speed of the drum shown in FIG. 3 is 5400 radians per minute, i.e., 90 radians per second. This means that the drum rotates three times for every frame. Preferably, as shown in FIG. 3, when a drum rotates once, two heads simultaneously generate two tracks. Accordingly, one frame consists of twelve tracks, each track consisting of four audio sectors.

Accordingly, the time required for half-rotating the drum is 1/180 seconds and, since the angle where a magnetic tape is wrapped on the drum is not 180°, when a lapping angle of the magnetic tape is set to θ, the corresponding time for generating one track is T1, where, $$T1 = 1/180 \times \theta/180 \qquad (1)$$

Furthermore, as shown in FIG. 4E through FIG. 4H, the memory enable signal for controlling memories 21 to 24 is provided for a predetermined time, i.e., x seconds, at the starting or ending portions of track generating time T1 of expression (1). First memory 21 is enabled by a memory enable signal (FIG. 4E) generated at the start portion of a track generating time of head A 51 and B 52. Second memory 22 is enabled by a memory enable signal (FIG. 4F) generated at the end portion of a track generating time of head A 51 and B 52. Third memory 23 is enabled by a memory enable signal (FIG. 4G) generated at the start portion of a track generating time of head A' 53 and B' 54, while fourth memory 24 is enabled by a memory enable signal (FIG. 4H) generated at the end portion of a track generating time of head A' 53 and B' 54. Preferably, a predetermined time x corresponds to the two audio sectors shown in FIG. 1A, for example, A1 and A2 sectors of the first track.

An audio signal recording operation can be explained in more detail with reference to the above description, as follows.

Figure 4:
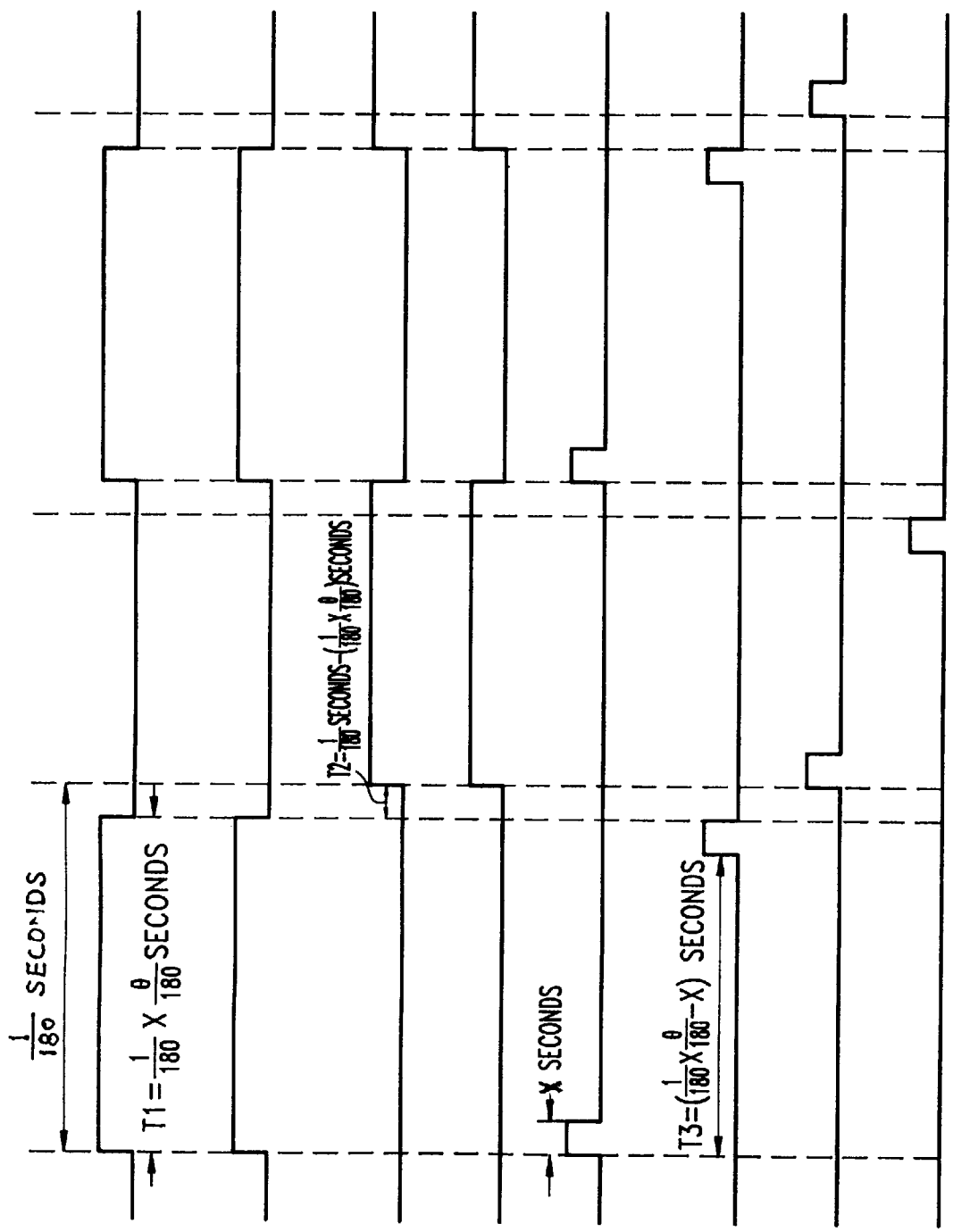
FIGS. 4A through 4H collectively form is a timing diagram showing the operation of the audio signal recording apparatus shown in FIG. 2.

When a magnetic tape is lapped to head A 51 and head B 52 on a drum, the data stored in first memory 21 by the memory enable signal shown in FIG. 4E is input to record processing unit 40. The head enable signals shown in FIGS. 4A and 4B are provided to head A 51 and head B 52 from control signal generator 30 so that the data can be recorded on the magnetic tape.

Even though head A 51 and head B 52 have offsets, the two heads perform recording operations at nearly the same time. Therefore, A1 data is recorded on the lowest audio sectors of the two tracks simultaneously, as shown in FIG. 7A.

Preferably, the A1 data simultaneously recorded onto the two track can become even-numbered data and odd-numbered data of first memory 21, which are output via record processing unit 40. When odd-numbered data of A1 data is recorded onto a certain track, even-numbered data of A1 data is recorded onto another track.

Figure 7B:
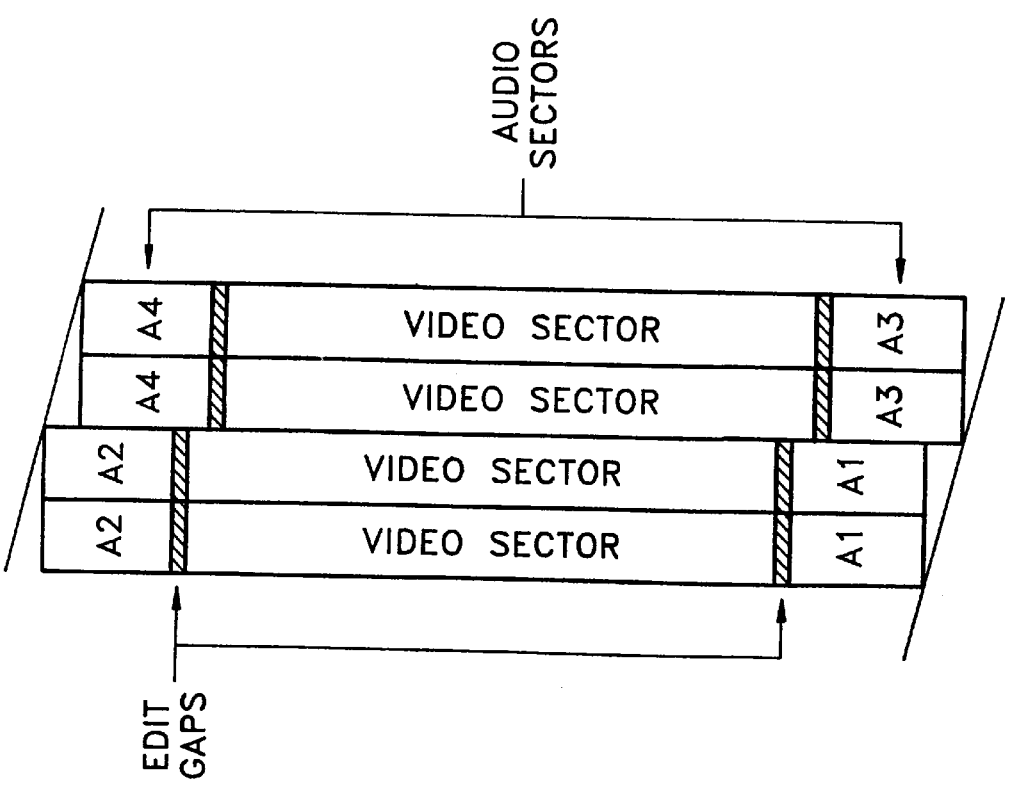
FIGS. 7A, 7B and FIG. 7C are views for illustrating a recording format of the magnetic tape recorded in accordance with an audio signal recording method of the present invention.
Figure 7A:
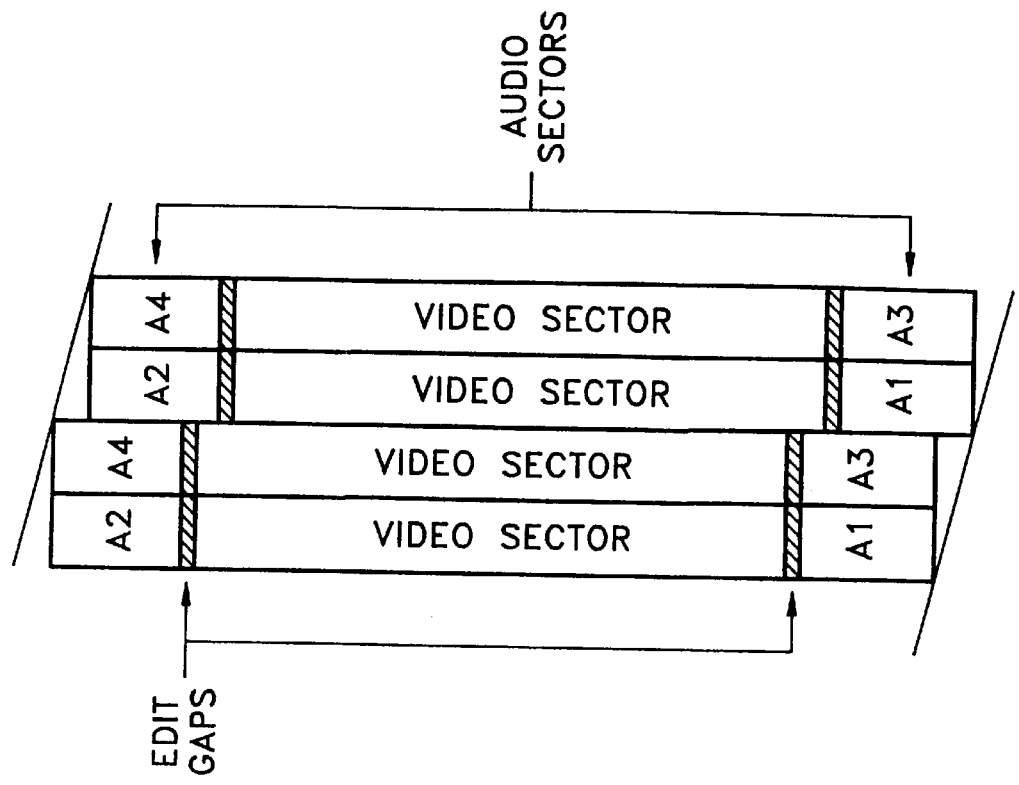

As shown in FIG. 7A, after audio signal A1 is recorded in a predetermined region of the lowest audio sector, the two channelled video signal stored in a video memory (not shown) is recorded onto a predetermined video sector by head A 51 and head B 52.

In the uppermost audio sector of a track, the data of second memory 22 is input to record processing unit 40 by the memory enable signal shown in FIG. 4F. As a result, A2 data is simultaneously recorded onto two tracks by head A 51 and head B 52.

The memory enable signal of FIG. 4F is generated at a "high" interval of head enable signals of FIG. 4A and FIG. 4B, after a predetermined time T3 has passed, which can be determined as follows.

$$T3 = 1/180 \times \theta/180 - x \qquad (2)$$

Like the A1 data of the lowest audio sector, when the odd-numbered data of A2 data is recorded on a predetermined track in the uppermost audio sector, the even-numbered data of A2 data is recorded on another track.

Thus, audio data A1 is first recorded on a sector in one track of magnetic tape, and audio data A2 is recorded after a video signal is recorded for a predetermined time.

Time T2, representing a period where a magnetic time is not lapped, can be expressed as follows.

$$T2 = 1/180 - (1/180 \times \theta/180) \qquad (3)$$

After time T2 has passed, the data stored in third memory 23 is input to record processing unit 40.

Advantageously, the head enable signal generated from control signal generator 30 so that an audio signal can be recorded onto a magnetic tape is as shown in FIGS. 4C and 4D. The signals are provided to head A' 53 and head B' 54.

Accordingly, third memory 23 is enabled only during "high" interval of memory enable signal as shown in FIG. 4G, and data A3 stored in third memory 23 is provided to head A' 53 and head B' 54 so as to be recorded on two tracks on magnetic tape.

After the video signal is recorded in a predetermined region of video sector, the data of fourth memory 24 is input to record processing unit 40. Fourth memory 24 is enabled during the "high" interval of the memory enable signal shown in FIG. 4H. Data A4 stored in fourth memory 24 is recorded on the two tracks on magnetic tape by head A' 53 and head B' 54.

Thus, audio data A3 is recorded on an audio sector of the next two tracks of the magnetic tape by head A' 53 and head B' 54. After a video signal is recorded for a predetermined time, audio data A4 is recorded.

Figure 5:
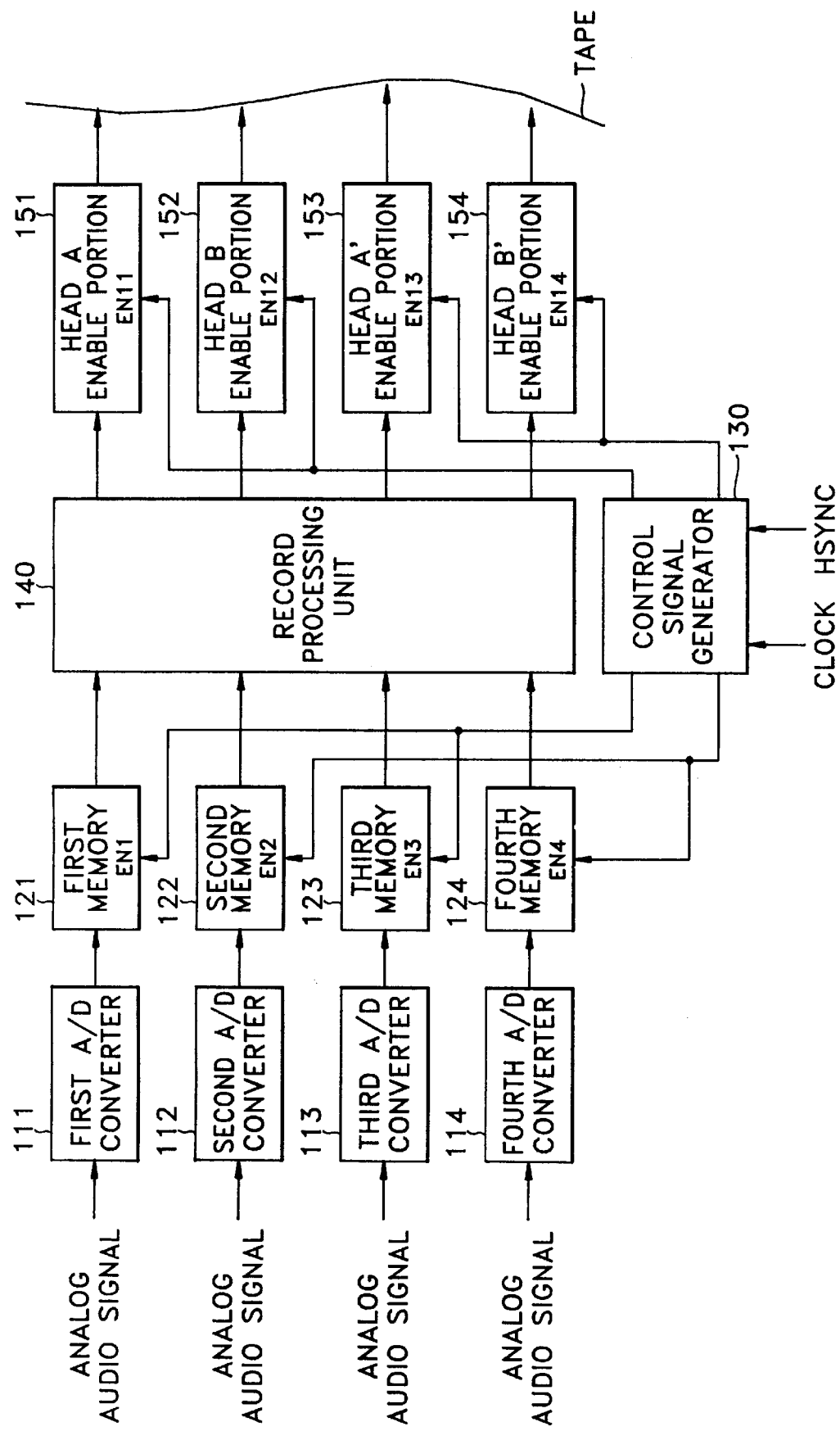
FIG. 5 is a block diagram of another embodiment of a VCR recording apparatus for an audio signal according to the present invention.

FIG. 5 is a block diagram of another preferred embodiment of a VCR recording apparatus for an audio signal according to the present invention.

When the structure of FIG. 5 and that of FIG. 2 are compared, it will be apparent that the principal difference is that first to fourth memories 21 to 24 are respectively enabled by memory enable signals (of FIGS. 4E through 4H) generated from control signal generator 30 in FIG. 2, while first memory 121 and third memory 123 are simultaneously enabled by memory enable signals (of FIG. 6E and FIG. 6F) generated from control signal generator 130 in FIG. 5, and second memory 122 and fourth memory 124 are simultaneously enabled by memory enable signals (FIGS. 6G and 6H).

Operation of the circuitry shown in FIG. 5 will now be explained while focusing on the relationship between a memory and the memory enable signal generated from control signal generator 130, with the repetitive portion of the explanation similar to that of FIG. 2 being omitted.

Referring to FIG. 5, a memory enable signal for controlling memories 121 to 124 is provided for a predetermined time of x seconds, as shown in FIG. 6E through FIG. 6H, at the starting or ending portions of track generating time T1, from expression (1). First memory 121 and third memory 123 are enabled by the memory enable signals shown in FIG. 6E and FIG. 6G, respectively, at the starting portion of track generating time of head A 151 and head B 152 or head A' 153 and head B' 154. Second memory 122 and fourth memory 124 are enabled by the memory enable signal shown in FIG. 6F and FIG. 6H, respectively, at the ending portion of track generating time of head A 151 and head B 152 or head A' 153 and head B' 154.

Preferably, when a magnetic tape is lapped by head A 151 and head B 152 on a drum, the data stored in first memory 121 and third memory 123 are input to record processing unit 140. The head enable signals shown in FIGS. 6A through 6B are provided from control signal generator 130 to head A 151 and head B 152, and the output of third memory 123 is recorded onto a track of magnetic tape.

After audio signals A1 and A3 are recorded, the two-channelled video signals are recorded from a video memory (not shown) by head A 51 and head B 52. See, e.g., FIG. 7B.

When the data stored in second memory 122 and fourth memory 124 are input to record processing unit 140, the output of second memory 122 is recorded on the track of a magnetic tape by head A 151, while the output of fourth memory 124 is recorded on the track of a magnetic tape by head B 152.

When a tape is lapped by heads A' 153 and B' 154, the above described operations will be performed.

Advantageously, the odd-numbered data, i.e., A1 and A3, are recorded on a magnetic tape by heads A 151 and A' 153, while the even-numbered data, i.e., A2 and A4, are recorded on a magnetic tape by heads B 152 and B' 154. The format of the thus-recorded tape is as shown in FIG. 7B.

The above-described operations exemplify the case where four audio channel signals are recorded on a magnetic tape. When an audio signal is recorded by the four channels, the number of audio sectors constituting one track is two, and the number of edit gaps is two. Accordingly, the signal relevant to the degree of two regions can be recorded.

Figure 1B:
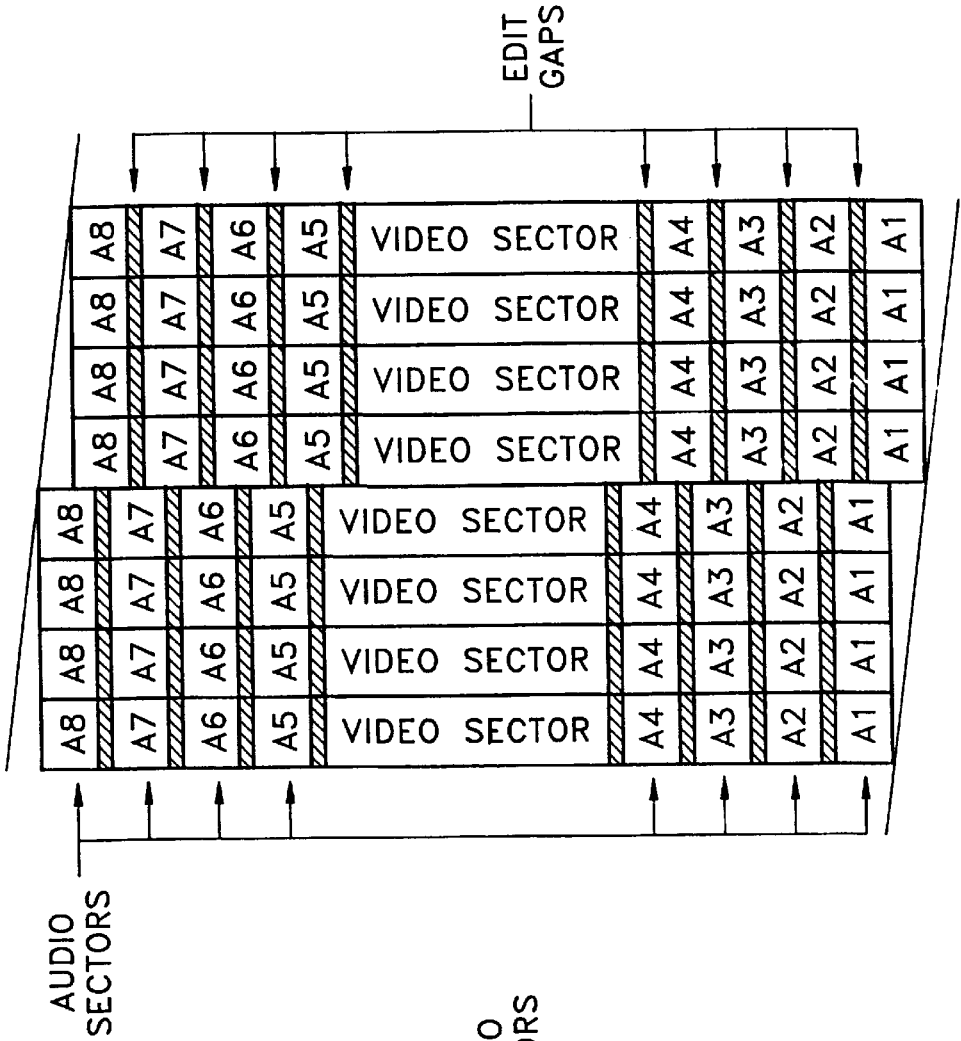
FIG. 1A and FIG. 1B are views for illustrating the recording formats of the magnetic tape recorded according to a conventional method for recording an audio signal using a VCR.
Figure 1A:
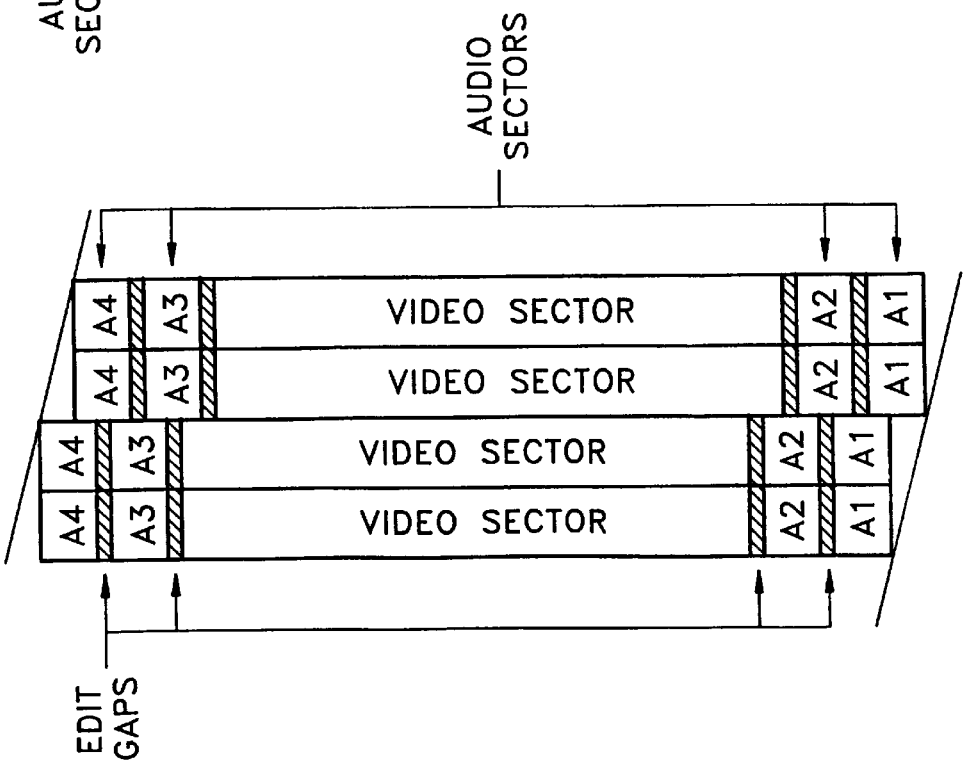
Figure 7C:
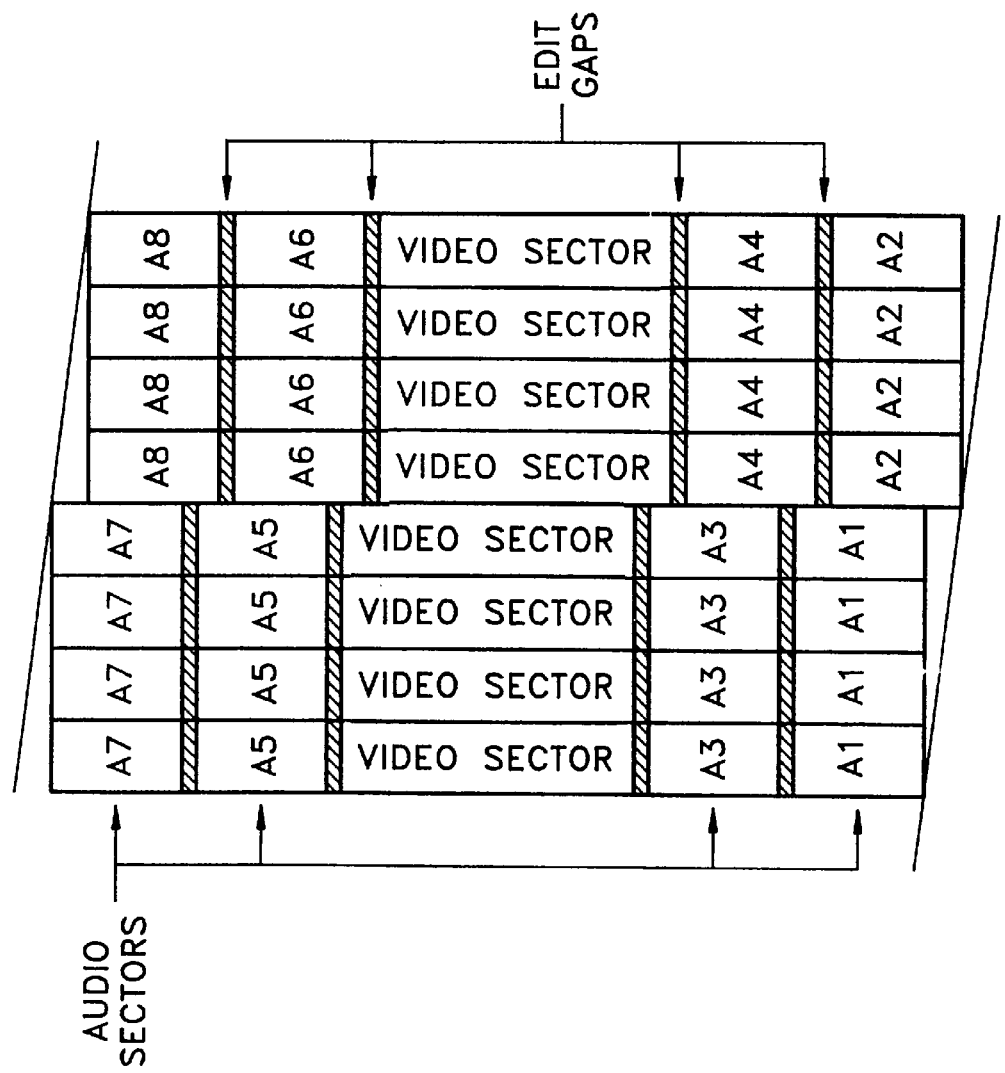

For example, when an audio signal is recorded by the eight channels in the system where the shortest record wavelength is 0.6 μm and the length of an edit gap is 0.3 mm, that is, when the tape shown in FIG. 1B is recorded as shown in FIG. 7C, approximately 4,000 bits of additional data (4×0.3 mm/(0.6 μm/2 bits)) can be recorded on one track.

In the thus-structured present invention, the number of edit gaps is reduced since an audio sector is reduced to N/2 when an audio signal is recorded by N channels onto a track. Therefore, more video or audio signals can be recorded in the edit gap region which is smaller as compared with the case where the signals are recorded onto the N audio sectors.

FIG. 7C shows a tape format where the eight audio channel signals are recorded on a track, and the four edit gaps are provided in one track. In the prior art, one track includes of eight edit gaps. However, according to the present invention, the number of edit gaps is reduced by half, which means that the available data recording region relevant to the degree of edit gap reduction is recovered.

The above-described relationship between the number of audio sector and the number of channels can be described as follows.

The number of audio sectors equals the number of channels divided by M, provided that M is an integer greater than 1.

Although the explanation of the present invention has been given with respect to four and eight channels, the present invention is not limited thereto.

Furthermore, the above description relates to N/2 audio sectors established per track when N channels are used according to an operation of the present invention. However, the number of audio sectors constituting each track can be inversely proportional to the number of channels. That is, the number of audio sectors, for example N/4 or N/8, established per track can be changed by controlling the memory enable signal and head enable signal generated from, e.g., the control signal generator shown in FIG. 2.

Thus, in a recording format, method and apparatus for an audio signal according to the present invention, an audio signal of N channels is divided into N sectors and recorded by being dispersed into a predetermined number of tracks. Therefore, audio or video signals in proportion to the degree of reduction of the edit gap region can be recorded on one track, according to the number of audio sectors being reduced to 1/M with respect to the number of channels, to thereby improve recording capacity.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A recording format for an audio signal generated by a VCR to a magnetic recording medium, wherein a plurality of tracks are formed on said magnetic recording medium, each track being divided into plural sectors with an edit gap for independent editing being disposed between adjacent sectors, at least one of the sectors on each track being a video sector for recording a video signal thereon, the remainder of the sectors of each track being audio sectors, and wherein said audio signal has N channels, N being a predetermined integer treater than 1, each audio sector containing audio information from a single corresponding audio channel; and wherein the number of audio sectors in each track is determined by the equation: a=N/M, where a is the number of audio sectors in each track, and M is a predetermined integer greater than 1 and which is a factor of N.

2. The recording format according to claim 1, wherein each of said tracks has a single video sector, and at least two audio sectors, at least one of said audio sectors being disposed at each end of said video sector.

3. A method for recording an audio signal, provided by a VCR, on a magnetic recording medium on which a plurality of tracks are formed, each track being divided into plural sectors with an edit gap for independent editing being disposed between adjacent sectors, at least one of the sectors on each track being a video sector for recording a video signal thereon, the remainder of the sectors of each track being audio sectors, the audio signal having N channels, N being a predetermined integer greater than 1, said method comprising the steps of:

(a) digitizing the audio signal input from an audio signal source for each of said N channels to thereby produce N channel digital signals;

(b) respectively storing said N channel digital signals produced by step (a);

(c) converting respective signals stored in the step (b) into N recordable signal channels suitable for recording onto the magnetic recording media; and (d) distributing said N recordable signal channels produced in step (c) between predetermined tracks so that each audio sector contains audio information from a single corresponding recordable signal channel and so that the number of audio sectors recorded on each track is determined according to the equation: a=N/M, where a is the number of audio sectors per track and M is a predetermined integer greater than 1 and which is a factor of N.

4. The method for recording an audio signal according to claim 3, wherein the number of audio sectors recorded in each track is half the predetermined number N of said channels.

5. The method for recording an audio signal of VCR according to claim 3, wherein said distributing step (d) further comprising controlling the recordable signals so that each adjacent sector of said magnetic recording media is recorded by the respective one of said recordable signals representing one of said N channel digital signals, so as to permit independent editing of each of said N channels.

6. The method for recording an audio signal according to claim 3, wherein each of said tracks has a single video sector, and at least two audio sectors, at least one of said audio sectors being disposed at each end of said video sector.

7. A VCR audio signal recording apparatus for recording a digital audio signal on a magnetic medium wherein a plurality of tracks are formed on said magnetic medium, each track being divided into plural sectors with an edit gap for independent editing being disposed between adjacent sectors, at least one of the sectors on each track being a video sector for recording a video signal thereon, the remainder of the sectors of each track being audio sectors, wherein the digital audio signal has N channels, N being a predetermined integer greater than 1, said apparatus comprising:

a plurality of memories for storing said N channels of said digital audio signal; and a controller for distributing the digital audio signal stored in said memories onto predetermined tracks so that each audio sector contains audio information from a single corresponding one of said N channels and so that the number of said audio sectors on each one of said predetermined tracks is equal to N/M, where M is a predetermined integer greater than 1, and where M is a factor of N.

8. The VCR audio signal recording apparatus according to claim 7, wherein said controller comprises:

a plurality of N heads on a drum;

a recording processor for processing said N channels output from said memories into recordable signals suitable for recording onto said magnetic medium; and a control signal generator for generating a memory control signal which controls said memories so as to permit predetermined ones of said N channels to be read from a respective memory and a head control signal for selectively enabling said N heads.

9. The VCR audio signal recording apparatus according to claim 8, wherein said recording controller records an audio signal of the same channel in an adjacent sector on said magnetic medium by selected ones of said N heads which have been selectively enabled by said head control signal to thereby permit said independent editing of each of said N channels.

10. The VCR audio signal recording apparatus according to claim 8, wherein the memory control signal generated from said control signal generator is activated during an audio sector period M-times larger than a respective reference audio section period, at the predetermined point of time of the actual period where said magnetic medium is lapped onto said drum wherein said reference audio section is determined by dividing said audio region by said predetermined number N.

11. The VCR audio signal recording apparatus according to claim 8, wherein the head control signal generated from said control signal generator is a signal whereby N/M of said heads are simultaneously enabled only for a period where magnetic medium is actually lapped onto said drum.

12. The VCR audio signal recording apparatus according to claim 7, wherein each of said tracks has a single video sector, and at least two audio sectors, at least one of said audio sectors being disposed at each end of said video sector.

13. A VCR audio signal recording apparatus for recording an audio signal on a magnetic medium wherein a plurality of tracks are formed on said magnetic medium, each track being divided into plural sectors with an edit gap for independent editing being disposed between adjacent sectors, at least one of the sectors on each track being a video sector for recording a video signal thereon, the remainder of the sectors of each track being audio sectors, wherein the audio signal has N channels, N being a predetermined integer greater than 1, each audio sector containing audio information from a single corresponding one of said N audio channels, said apparatus comprising:

N analog-to-digital converters for converting the audio signal, having N channels, input from an audio signal source, into a digital audio signal having N channels;

N memories for storing, respectively, the N channels of the digital audio signal;

N heads for recording the output of said N memories in predetermined respective audio sectors; and a control signal generator for generating a head enable signal, which enables a first N/2 heads while a second N/2 heads are disabled, and a memory enable signal provided to said each of said N memories, whereby one of said first and said second of said N/2 heads records data stored in a selected one of said N memories onto said audio region of the track simultaneously with the other of said first and said second of said N/2 heads records data stored from the same selected memory so that the audio signal representing the corresponding channel can be recorded in an adjacent track on said magnetic medium, wherein N is a multiple of 2.

14. The VCR audio signal recording apparatus according to claim 13, wherein said control signal generator generates a first memory enable signal which simultaneously enables said memories of respective odd-numbered channels and a second memory enable signal which simultaneously enables said memories of respective even-numbered channels so as to permit respective outputs of said memories representing one of said odd and even-numbered channels to be recorded in predetermined ones of said N audio sectors by said N/2 heads.

15. The VCR audio signal recording apparatus according to claim 13, wherein each of said tracks has a single video sector, and at least two audio sectors, at least one of said audio sectors being disposed at each end of said video sector.

* * * * *